(12) United States Patent
Gomes De Oliveira et al.

(10) Patent No.: US 11,880,474 B2
(45) Date of Patent: Jan. 23, 2024

(54) COVERS OR COMPONENTS FOR CELL PHONES OR OTHER DIGITAL DEVICES FEATURING PHYSICAL CRYPTOGRAPHY TO FORWARD AND RECEIVE ENCRYPTED MESSAGES ON A TAMPER-PROOF BASIS

(71) Applicant: Joao Carlos Gomes De Oliveira, Santana De Parnaiba (BR)

(72) Inventors: João Carlos Gomes De Oliveira, SP (BR); Procópio Gomes De Oliveira Netto, SP (BR); Felipe Gomes De Oliveira, SP (BR); Daniel Gomes De Oliveira, SP (BR)

(73) Assignee: Joao Carlos Gomes De Oliveira, Santana de Parnaiba Sp (BR)

( * ) Notice: Subject to any disclaimer, the term of this patent is extended or adjusted under 35 U.S.C. 154(b) by 270 days.

(21) Appl. No.: 17/368,117

(22) Filed: Jul. 6, 2021

(65) Prior Publication Data
US 2022/0014925 A1   Jan. 13, 2022

(30) Foreign Application Priority Data
Jul. 7, 2020   (BR) ...................... 20 2020 013840 0

(51) Int. Cl.
*G06F 21/60*   (2013.01)
*H04L 9/40*   (2022.01)
*H04L 9/08*   (2006.01)

(52) U.S. Cl.
CPC .............. *G06F 21/602* (2013.01); *H04L 9/08* (2013.01); *H04L 63/0428* (2013.01)

(58) Field of Classification Search
CPC .... G06F 21/602; G06F 21/6209; G06F 21/84; H04L 9/08; H04L 63/0428; H04L 9/38; H04M 1/0266; H04M 1/19; H04M 1/7243; H04M 1/7246; H04W 12/033
See application file for complete search history.

(56) References Cited

U.S. PATENT DOCUMENTS

| | | | |
|---|---|---|---|
| 11,057,214 B2* | 7/2021 | Kim | G06F 21/35 |
| 2006/0177060 A1* | 8/2006 | Johnson | H04N 1/3876 |
| | | | 380/255 |
| 2010/0020970 A1* | 1/2010 | Liu | G06K 7/1093 |
| | | | 380/54 |
| 2011/0117883 A1* | 5/2011 | Drabo | H04W 12/033 |
| | | | 380/247 |
| 2019/0335058 A1* | 10/2019 | Fukushima | H04L 9/0825 |
| 2021/0306807 A1* | 9/2021 | Kashani-Nejad | G08B 7/06 |

\* cited by examiner

*Primary Examiner* — Abiy Getachew
(74) *Attorney, Agent, or Firm* — BROWDY AND NEIMARK, P.L.L.C.

(57) ABSTRACT

A cover or components for cellphones or other digital devices featuring physical cryptography to forward and receive encrypted messages on a tamper-proof basis which uses physical encryption to send encrypted messages between two or more users, in which decoding of the forwarded message takes place by overlaying (30) on the cell phone device or digital device (1) a key image cover (20) matching the forwarded matrix image (10).

9 Claims, 4 Drawing Sheets

COVERS OR COMPONENTS FOR CELL PHONES OR OTHER DIGITAL DEVICES FEATURING PHYSICAL CRYPTOGRAPHY TO FORWARD AND RECEIVE ENCRYPTED MESSAGES ON A TAMPER-PROOF BASIS

TECHNICAL FIELD

The present Utility Model patent addresses the presentation of a new layout for covers or components of cell phones or other digital devices, which enable the physical cryptography of forwarded messages, preventing said messages from being viewed by third parties.

BACKGROUND OF THE ART

The concept of visual cryptography was introduced by Moni Naor and Adi Shamir at the EUROCRYPT conference, in Italy, in 1994.

The concept of visual cryptography consists, basically, in encrypting an image, which is the matrix, using another image, which is its key, by overlaying. The key image, when overlaid on the matrix image, forms the message to be conveyed.

The final message will only appear if the matching key image is used with the matrix image. Any other key image used overlaid on the matrix image will not result in the forwarded message.

Unlike digital cryptography (used by computer software, on-line data transmission, etc.), this physical cryptography is practically tamper-proof, because, without the correct key, the message is not obtained, and, given the amount of information that can be condensed into the visual key, and due to its two-dimensional nature, the possibilities of discovering the key by trial and error are almost non-existent, since, in high security digital cryptography specifications such as AES-256, we have $2^{256}$ possibilities for a given key; on the other hand, in a visual cryptography system with, for example, 50×100 pixels, we have $2^{5000}$ possibilities for such a key, and may be much larger, depending on the image resolution. Visual cryptography, therefore, can generate a number of possibilities for a given key that, today, can be considered mathematically infinite, which is not possible with regular digital cryptography.

Another major benefit is that the two-dimensional nature of physical cryptography yields, during the process of breaking by trial and error, partial results that are totally inconclusive, or even misleading, where letters, numbers, figures, or other information may appear even without have nothing to do with the correct key. These results are totally different from those obtained with digital cryptographies, during whose breaking process progressively discovering which key is not the correct one is possible, even without knowing which is the correct one.

This simple security difference can, by itself, put visual cryptography systems technologically a step ahead of the development of quantum computers for cryptographic keys cracking, which will be theoretically able to render digital cryptography as we know it obsolete in the future.

Document EP 1 509 879 B1, of May 20, 2003 (priority May 21, 2002), provides a tamper-proof visual encoding process and device, which basically consists of overlaying one image on another, so as to form the final message.

Document EP 1 579 380 B1, of Nov. 17, 2003 (priority Dec. 16, 2002), provides a luminosity-aided visual coding process and device that basically consists of overlaying the matrix image on the key image, applying direct lighting to those images to form the actual message.

Document U.S. Pat. No. 8,009,326, of Jan. 5, 2010, also provides a visual cryptography system, intended for a voting system, and that also uses image overlaying to obtain the final message.

Documents US 2005/0044395, of Feb. 24, 2005, Usc2006/0179407, of Mar. 15, 2004, US 2006/0210080, of Nov. 17, 2003, US 2014/013683, of Nov. 15, 2012, WO2016074802, of Nov. 24, 2014, and WO 2017/209363, of Dec. 14, 2016, among others, similarly provide the use of physical cryptography for message hiding and viewing.

OBJECTIVES AND BENEFITS HEREOF

Until recently, there was no need to hide messages sent, since the format used—paper letter—was tamper-proof, since it is a physical document, unless subtracted from the recipient.

With the arrival of electronic messages, more and more people need confidentiality for their communications, which is virtually impossible to achieve with digital messages.

The current State of the Art, mirrored by the documents listed, provides solutions for the use of physical cryptography, however, it is difficult for users to apply it in their daily lives.

With the arrival of cell phones and personal computers, many software products and applications were developed to encrypt messages; however, as the encrypted messages are still digitally transmitted and decoded, decoding becomes relatively easy. In addition, in these cases, the entire encryption and decryption process is completely out of the user's control, which even leads to user distrust regarding the actual security and privacy of the entire process.

And the application of any of the solutions listed in the documents also causes inconvenience, since the key images, which will be overlaid, have to be loaded in a binder, folders, etc.

Thus, to address such inconveniences, a new layout in covers or components of cell phones or other digital devices has been developed, so that they receive key images and can instantly decode messages sent by another cell phone or other digital device.

The message sender types his message on his cell phone or other digital device, and this message is encrypted by a pre-installed, cryptography app (mobile application) or software product existing in the market, and forwards this message to the message recipient.

The recipient of the message puts on the cover of a cell phone or other digital device, or uses a pre-existing component thereof, with the key image corresponding to the forwarded matrix image, being able to decrypt the message sent, without the need to install any program or app (mobile application) on his device. The cryptography app or software is installed on the device that forwards the message only.

If the recipient does not use the cover with the key image or uses a cover with a different key image, he will not be able to decode said message.

In addition, the same message may be forwarded to more than one different recipient, each of which, by laying the cover with the key image over their cell phone or digital device, or using a pre-existing component thereof, will decode a different message, i.e., the sender types only one set of characters (matrix image), sends this set of characters to several recipients, and, depending on the key image the recipient has, a different message will be decoded.

As the cover of the cell phone or digital device, or a pre-existing component thereof, which contains the key image, has the shape of that cell phone or device, its use is automatic and instantaneous, and transporting it in folders, binders, etc. is not necessary.

Another layout provided consists installing a secondary keypad with shielded hardware on said cover of the cell phone or digital device, having its own operating system, totally independent of the operating system of the cell phone or device.

The message sender uses a secondary shielded keypad, so that his typing cannot be intercepted, and may be attached to the cover of the cell phone or device; it may also be retractable or even a part of the original construction of the device, such as a component. The sender types the message on the secondary keypad, which is automatically encrypted by its shielded hardware, then forwarded via Bluetooth, or physical connection, to his cell phone or digital device, and the cell phone or device forwards the message to the recipient's cell phone or device, by any delivery means.

The recipient receives the message on his cell phone or device and, using the cover or component with the correct key image, he can automatically read the message. The cover or component may have a mechanism to allow different keys to be used, either by physical or digital image exchange, through a transparent screen capable of digitally overlaying different keys on the cell phone or device screen, depending on the user's requirements.

This new constructive layout is primarily intended to provide physical cryptography of messages via cell phones or other digital devices, rendering the message tamper-proof, so that, even if the message is intercepted by third parties at some point of its creation, transmission or storage, its decoding is impossible.

DESCRIPTION OF THE FIGURES

Augmenting the present description, so as to provide better understanding of the features hereof, and pursuant to a preferred embodiment hereof, the description is followed by a set of drawings, where, as an example, although not limiting, the following was depicted:—

DETAILED DESCRIPTION OF THE SUBJECT MATTER

Figure 1:
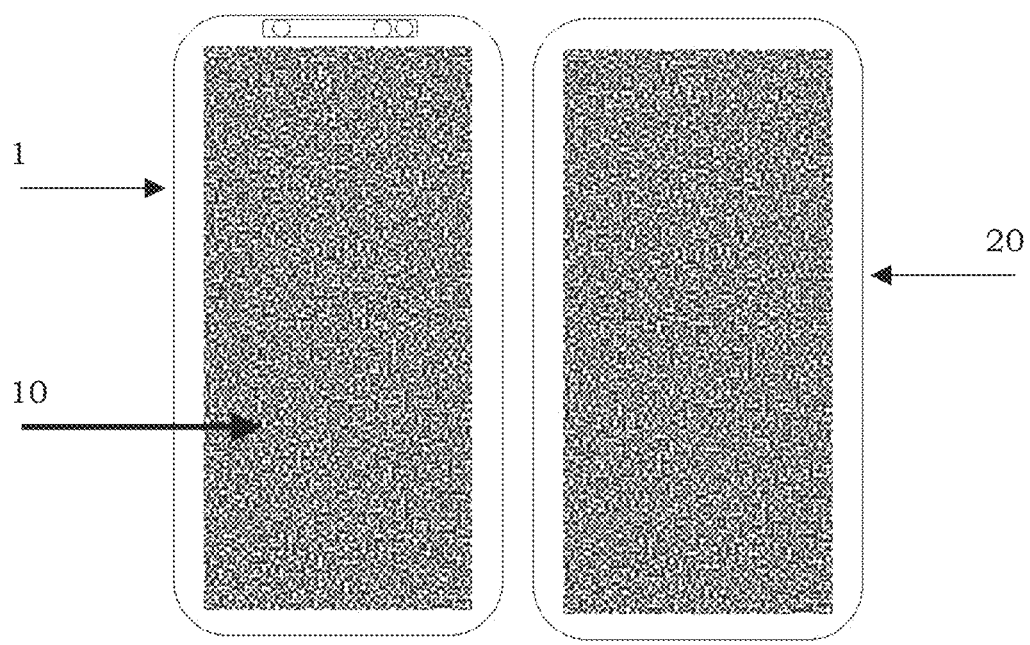
FIG. 1—Top view of the cell phone screen and cell phone cover;—
Figure 2:
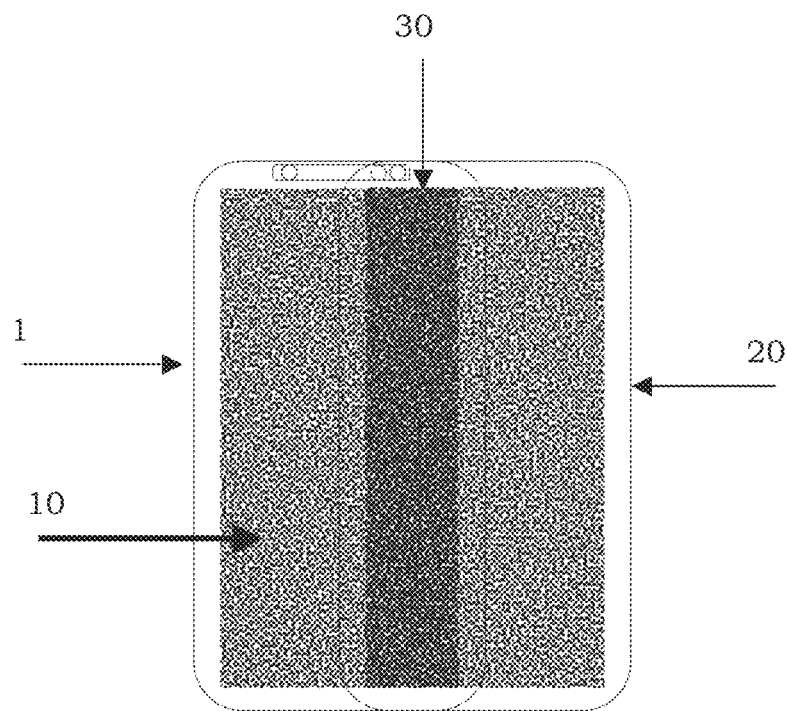
FIG. 2—View of the cell phone screen with the cover with the key image, in the overlaying process;—
Figure 3:
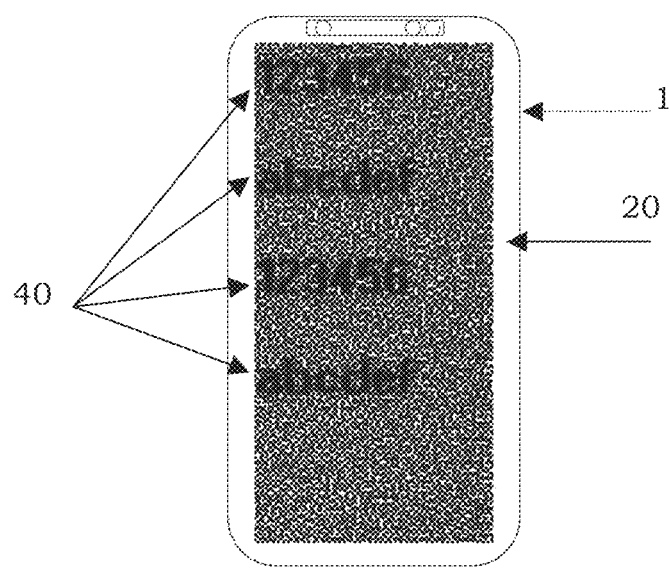
FIG. 3—View of the cell phone screen, with the cell phone cover overlaid and the message decoded;—
Figure 4:
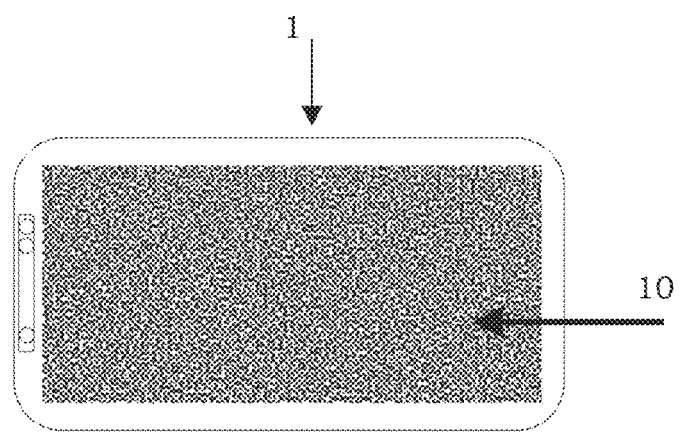
FIG. 4—View of the cell phone screen with the encrypted message, without the cover containing the key image;—
Figure 5:
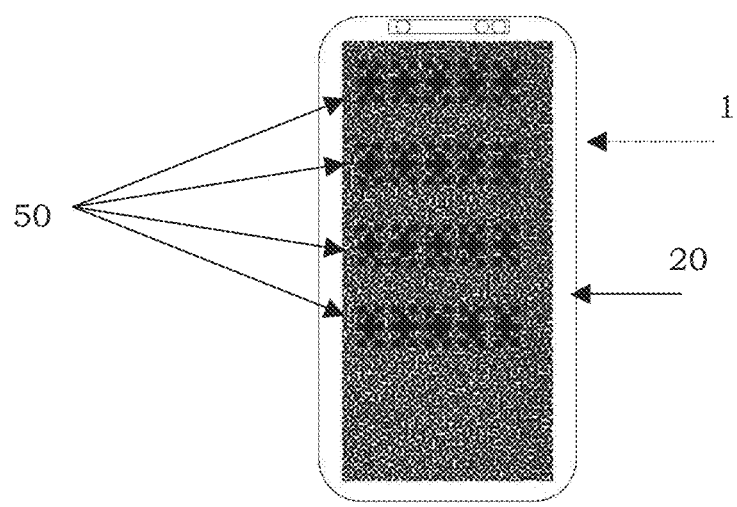
FIG. 5—View of the cell phone screen with the cover containing the wrong key image;—
Figure 6:
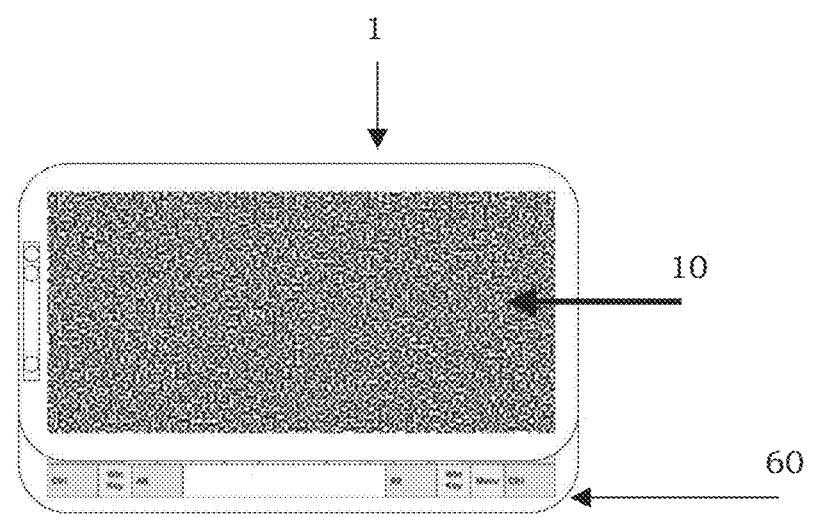
FIG. 6—View of the cell phone with the cell phone cover containing a half-opened retractable keypad;—
Figure 7:
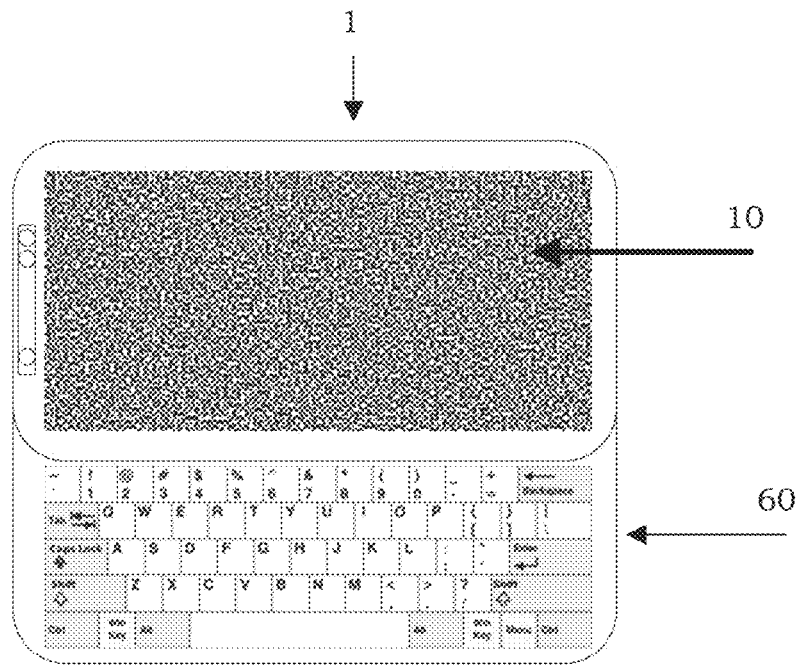
FIG. 7—View of the cell phone with cell phone cover containing a horizontally opened retractable keypad;—
Figure 8:
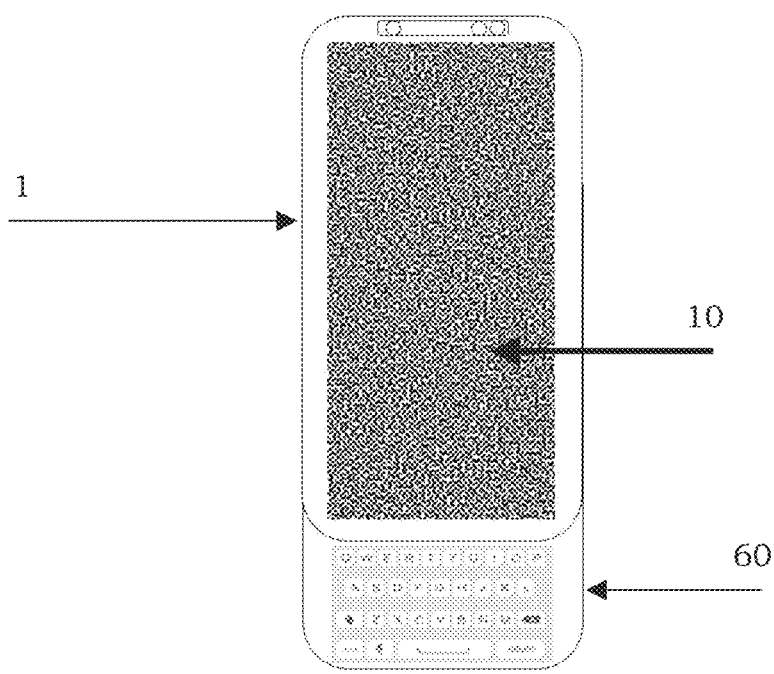
FIG. 8—View of the cell phone with cell phone cover containing a vertically opened retractable.

Referring to the illustrated drawings, the present privilege refers to a new setup in "COVERS OR COMPONENTS FOR CELL PHONES OR OTHER DIGITAL DEVICES FEATURING PHYSICAL CRYPTOGRAPHY TO FORWARD AND RECEIVE ENCRYPTED MESSAGES ON A TAMPER-PROOF BASIS"; more precisely, the present utility model addresses the use of physical cryptography, for sending and receiving messages by cell phones or other digital devices (1), which allows the exchange of messages between two or more users, on a completely secure manner, without the possibility of tampering or reading of the message by third parties.

According to the present, the message sender types his message on his cell phone or other digital device (1), and this message is encrypted by a cryptography app (mobile application) currently in the market or a computer program currently in the market, pre-installed on the cell phone or digital device (1), forming a matrix image (10), and forwards this message to the message recipient.

To decode the encrypted message, the message recipient does not need any cryptography app or computer software pre-installed on his cell phone or other digital device (1), and, when receiving the message with the matrix image (10) sent by the sender, overlays (30) the cover (20) on his cell phone or other digital device (1) with the key image corresponding to the matrix image (10) sent by the sender, being able to view (40) the message received.

The sender of the encrypted message informs the recipient of said message, and the key image layer (20) matching the matrix image (10) that said recipient should use to view (40) the forwarded message.

Should a cover (20) with the key image different from that informed by the message sender be used, said message will not be decoded, or it may be mistakenly decoded, generating a message (50) other than the message sent. Different layers (20) producing different messages for more than one user from the same and single initial message is also possible.

This utility model also allows the sender to forward the same message to an unlimited number of recipients, provided that these recipients have the cover (20) with the correct key image matching the forwarded matrix image (10).

To encrypt the message, the sender may use any app (mobile application) or computer software existing on the market and pre-installed on his mobile device or digital device (1), since reading the message will not depend on the cryptography program, but on the correct and message-specific decoding layer (20), matching the forwarded matrix image (10).

The sender can also encrypt several different messages from a single typed message, and forward them to several recipients, with each individual recipient decoding their specific message, according to the cover (20) of the key image indicated to them, with the correct viewing (40).

The message can also be typed through a secondary keypad (60) with sealed hardware, either fastened or not to the cell phone or digital device (1), and may even be retractable, with the sender typing the message normally on this secondary keypad (60) with sealed hardware, and this message is encrypted and temporarily recorded on said sealed hardware installed inside said secondary keypad (60), and this sealed hardware encrypts and sends the message already encrypted to the mobile device or digital device (1) of the sender, through Bluetooth or physical connection, and the mobile device or digital device (1) of the sender sends the message already encrypted to the recipient(s), through any message-sending means.

Upon receiving the message, the recipient(s) receive(s) the indication of which key image should be used, and overlay(s) the respective key image cover (20) on the screen of their mobile device or digital device (1), decoding the forwarded message and enabling its correct viewing (40).

Using a key image cover (20) not matching the forwarded matrix image (10) will result in the display of a message (50) other than the one forwarded.

The recipient does not need to have an encryption or decryption app or computer software pre-installed on his cell phone or digital device (1), as the decryption is done physically by overlaying (30) the cover (20) with the key image matching the forwarded matrix image (10). Without the cover (20) containing the key image matching the forwarded matrix image (10), viewing (40) the correct content of the forwarded message is impossible.

Of course, when the present utility model is put into practice, modifications may be introduced with regard to certain construction and shape details, without entailing a departure from the fundamental principles, which are clearly substantiated in the claim framework, being thus understood that the terminology used was not intended as a limitation.

The invention claimed is:

1. A cover or components for cell phones or other digital devices featuring physical cryptography to forward and receive encrypted messages on a tamper-proof basis that uses physical cryptography to decode (40) messages, that allows messaging between two or more users, in a completely secure way, without the possibility of third parties tampering or reading the message, comprising:
    a cover (20);
    the cover (20) containing a key image matching to a matrix image (10);
    the key image being arranged such that when a sender types a message on a cell phone or other digital device (1) of the sender, and the message is encrypted by a cryptography app (mobile application) or computer software, pre-installed on said cell phone or other digital device (1) of the sender, forming the matrix image (10), said matrix image (10) being forwarded by any means to a message recipient, and the message recipient, upon receiving the message with the matrix image (10), uses, on a cell phone or digital device (1) of the recipient, the cover (20) containing the key image matching to the matrix image (10) sent, said message is viewable (40) by the message recipient.

2. The cover or components for cell phones or other digital devices featuring physical cryptography to forward and receive encrypted messages on a tamper-proof basis according to claim 1, wherein the message to be forwarded is encrypted by any app (mobile application) or computer software, regardless of its security level, forming the matrix image (10), where this matrix image (10) can be forwarded to one or more recipients, by any means.

3. The cover or components for cell phones or other digital devices featuring physical cryptography to forward and receive encrypted messages on a tamper-proof basis according to claim 1, wherein when the recipient, upon receiving the message forwarded with the matrix image (10), place on (30) the cell phones or other digital devices (1) of the recipient, the cover (20) containing key image matching the matrix image (10) forwarded by the sender, the cover (20) containing the key image allows viewing (40) the message sent.

4. The cover or components for cell phones or other digital devices featuring physical cryptography to forward and receive encrypted messages on a tamper-proof basis according to claim 1, wherein when a single message encrypted at the source includes different contents intended for several recipients, each recipient, from a respective cover (20) containing the matching key image, although receiving the same matrix image (10), will view (40) a specific content, different from the content viewed by the other recipients.

5. The cover or components for cell phones or other digital devices featuring physical cryptography to forward and receive encrypted messages on a tamper-proof basis according to claim 1, wherein the message recipient does not require, to view the message content, an app (mobile application) or computer software for cryptography or decoding pre-installed on his mobile device or digital device (1) of the recipient, since the received messages are decoded by overlaying (30) the cover (20) with the key image matching the forwarded matrix image (10).

6. The cover or components for cell phones or other digital devices featuring physical cryptography to forward and receive encrypted messages on a tamper-proof basis according to claim 1, wherein the cover (20) containing the key image features a limited viewing angle, to prevent others from viewing the message content at an oblique angle.

7. The cover or components for cell phones or other digital devices featuring physical cryptography to forward and receive encrypted messages on a tamper-proof basis according to claim 1, wherein the message can be typed through a secondary keypad (60) with sealed hardware, either fastened or not to the cell phone or digital device (1) of the sender, and may even be retractable, with the sender typing the message normally on the secondary keypad (60) with sealed hardware, and this message is encrypted by forming the matrix image (10) and temporarily recorded on said sealed hardware installed inside said secondary keypad (60), and this sealed hardware encrypts and sends the message already encrypted to the mobile device or digital device (1) of the sender, through Bluetooth or physical connection, and the mobile device or digital device (1) of the sender sends the message already encrypted to the recipient, through any message-sending means.

8. The cover or components for cell phones or other digital devices featuring physical cryptography to forward and receive encrypted messages on a tamper-proof basis according to claim 1, wherein viewing (40) the correct content of the forwarded message is impossible without the cover (20) containing the key image matching to the forwarded matrix image (10).

9. The cover or components for cell phones or other digital devices featuring physical cryptography to forward and receive encrypted messages on a tamper-proof basis according to claim 1, wherein not using the cover (20) matching the forwarded matrix image (10) results in the display of a message different (50) from the one originally forwarded.

* * * * *